June 3, 1947.  T. B. MARTIN ET AL  2,421,514

DUAL ROTATION PROPELLER

Filed Aug. 19, 1943   8 Sheets-Sheet 2

INVENTORS
THOMAS B. MARTIN
KENNETH L. BERNINGER
their ATTORNEYS

INVENTORS
THOMAS B. MARTIN
KENNETH L. BERNINGER
BY
their ATTORNEYS

INVENTORS
THOMAS B. MARTIN
KENNETH L. BERNINGER
BY
their ATTORNEYS

UNITED STATES PATENT OFFICE 2,421,514

DUAL ROTATION PROPELLER

Thomas B. Martin and Kenneth L. Berninger, Dayton, Ohio, assignors to General Motor. Corporation, Detroit, Mich., a corporation of Delaware Application August 19, 1943, Serial No. 499,240

14 Claims. (Cl. 170—135.6)

This invention relates to aircraft propellers of the tandem type in which two complete propeller assemblies, rotate in opposite directions, and are hydraulically controlled to constant speed operation, which speed is selectible at a remote point within the cockpit.

It is an object of the inventiton to so constitute a propeller mechanism of the class described that it may be controlled as to speed by hydraulically operated pitch changing mechanisms separate and distinct from each other, but one initiating the pitch shift for the other, with interconnecting gear mechanism for coordinating the pitch shifts of the two propeller mechanisms.

Another object of the invention is to provide a dual rotation propeller in which both propeller mechanisms are self contained hydraulic units with no interconnecting fluid circuits, or connections to outside points.

Another object of the invention is to provide interconnecting means between the two propellers that will obviate the necessity of critical concentricity and alignment between the inboard and outboard propellers, and between the inboard propeller and the engine nose.

Another object of the invention is to provide means whereby coordination of blade angles between the two propellers is independent of the relative fore and aft position of the two propellers, so that no installation adjustment is required to compensate for their relative positions.

Another object of the invention is to provide a cyclical coordinating mechanism that has no limits of travel within itself and that is of sufficient sensitivity of adjustment to be capable of alteration to suit predetermined indexing.

A further object of the invention is to provide an inter-propeller control mechanism capable of efficient and certain operation for lineal differences in blade angle between the two propellers.

Another object is to provide means whereby the coordination of blade angle between the two propellers is easy to accomplish and check at each installation, and easy to adjust when need or desire arises.

A further object of the invention is to provide a dual rotation propeller comprising a constant speed propeller assembly, and a controllable pitch propeller assembly whose control is initiated by the pitch shift of the constant speed assembly.

A still further object is to provide a propeller of the class specified in which the contributing propeller assemblies are wholly complete in themselves and self contained with respect to their control mechanism and hub fairing means or spinner, with built-in anti-icing means, whereby mounting on a drive shaft obviates the necessity of linkage and levers with complicated adjustments.

Yet another object is to provide a dual rotation propeller with hub fairing that will preserve the streamlining of the craft, yet not require excessive time and technicians for installation.

Contributing to the principal or foregoing objects is the object to provide anti-icing means for both propeller assemblies, and to protect the delivery of an anti-icing medium against dispersion until delivered at the root of the intended blade.

Another object of the invention is to provide an inboard constant speed propeller with special provisions at the forward end for supporting the intershaft bearing, and for indicating its blade angle to the outboard propeller.

Another object is to provide an outboard controllable pitch propeller that receives the pitch indication from the inboard propeller and automatically adjusts its own blade angle to agree with the blade angle of the inboard propeller.

Yet another object of the invention is to provide a dual opposite rotation propeller, in which the specific control mechanism of the inboard propeller includes a distributor valve constituting a centrifugally responsive governor whose speed setting is controlled from the cockpit, and in which the specific control mechanism of the outboard propeller includes a distributor valve responsive to the difference in blade angle between the two propellers, and is controlled by interlinking mechanism between the two master gears of the blade coordinating means.

Further objects and advantages of the present invention will be apparent from the following description, reference being had to the accompanying drawings wherein preferred embodiments of the present invention are clearly shown.

Referring generally to the drawings, and specifically with respect to Figs. 1, 14 and 15, 10 refers to the engine nose or gear-casing of an aircraft from which projects in rotative relation a pair of oppositely rotating telescopically arranged shafts 12 and 14. Mounted on the radially outer shaft 12, is an inboard propeller unit 16 comprising a hub 18 fitted with a desired number of controllable pitch blades 20 extending from blade sockets 22. Mounted on the radially inner shaft 14 is an outboard propeller unit 24 comprising a hub 26 fitted with a desired number of controllable pitch blades 28 extending from sockets 30. Both propeller units are provided with individual automatic pitch controlling mechanisms built-in as self contained units, so that one propeller and its control mechanism may be mounted on the shaft 12, and the other propeller and its control mechanism may be mounted on the shaft 14, simply by moving the units respectively in place on their shafts and then securing with appropriate shaft nuts. In so doing, an interconnecting mechanism 32 situated between the hubs 18 and 26 appropriately connects the control mechanism of one propeller unit with the control mechanism of the other propeller unit as will be described in due course. Suffice it then, here, to say, that the inboard hub 18 with its blades 20, is affixed with a control unit or regulator 34, and supports a spinner section 36 suitable to be mounted on the shaft 12 adjacent to the engine nose 10, and provides a part of the interconnecting mechanism 32, at its forward end. And likewise, the outboard hub 26 with its blades 28 and affixed with a control or regulator 38, supporting a spinner section 40, is also provided with a cooperating part of the interconnecting mechanism 32, and is mountable on the shaft 14.

The spinner sections 36 and 40 are each substantially generated conic portions designed to blend in with the nacelle of the craft and provide proper fairing for the hubs so that streamlining of the craft is preserved from the air piercing portion at the axis of the propeller shaft throughout the length of the craft. Contributing toward that, the spinner section of the inboard propeller 16 comprises a truncated conic portion of sheet metal or the like, provided with a flange or head portion 42 at its smaller end that is adapted to be fastened to the front end of the hub 18 by screw devices 44, while its peripheral surface is notched at 46 to allow for passing of the blades 20. The notches 46 are reinforced with strips 48 secured on the inside of the shell 36 and provide ledges for reception of filler plates 50 which span the cut outs 46 and where they are secured by quickly detachable fasteners 52. Attached to the inside of the spinner shell 36 and near the base end there are webs 54 and 56 which, as the spinner is moved inwardly, engage supporting pilot pins 58 positioned around the periphery of the regulator 34. Thus, when the spinner section is mounted in place, the base end of the spinner projects aft far enough to extend over the end of the engine nosing 10, while its forward end projects sufficiently far enough ahead of the propeller disc of rotating blades to end in an offset portion 60 outwardly of the interconnecting mechanism 32.

The spinner section 40 for the outboard propeller comprises a generated cone inside of which there is fastened a head-member 62, and web portions 64, 66 by which the section is similarly supported on the hub 26 and regulator 38. It, like the section 36 for the inboard propeller is slidable over the hub and blade roots to engage the pilot pins, but is additionally characterized by holding means in the form of a rod 68 anchored to the hub 26. A cover plate 69 covers the head of the rod 68 where it is held by a spring lock 70 at the air piercing end of the cone. The section 40 is similarly notched at 46 and the unoccupied portions are filled in by the plates 50, all so that the base end of the generated cone 40 may overlap outward of the offset portion 60.

Figures 1, 17, 18, 19:
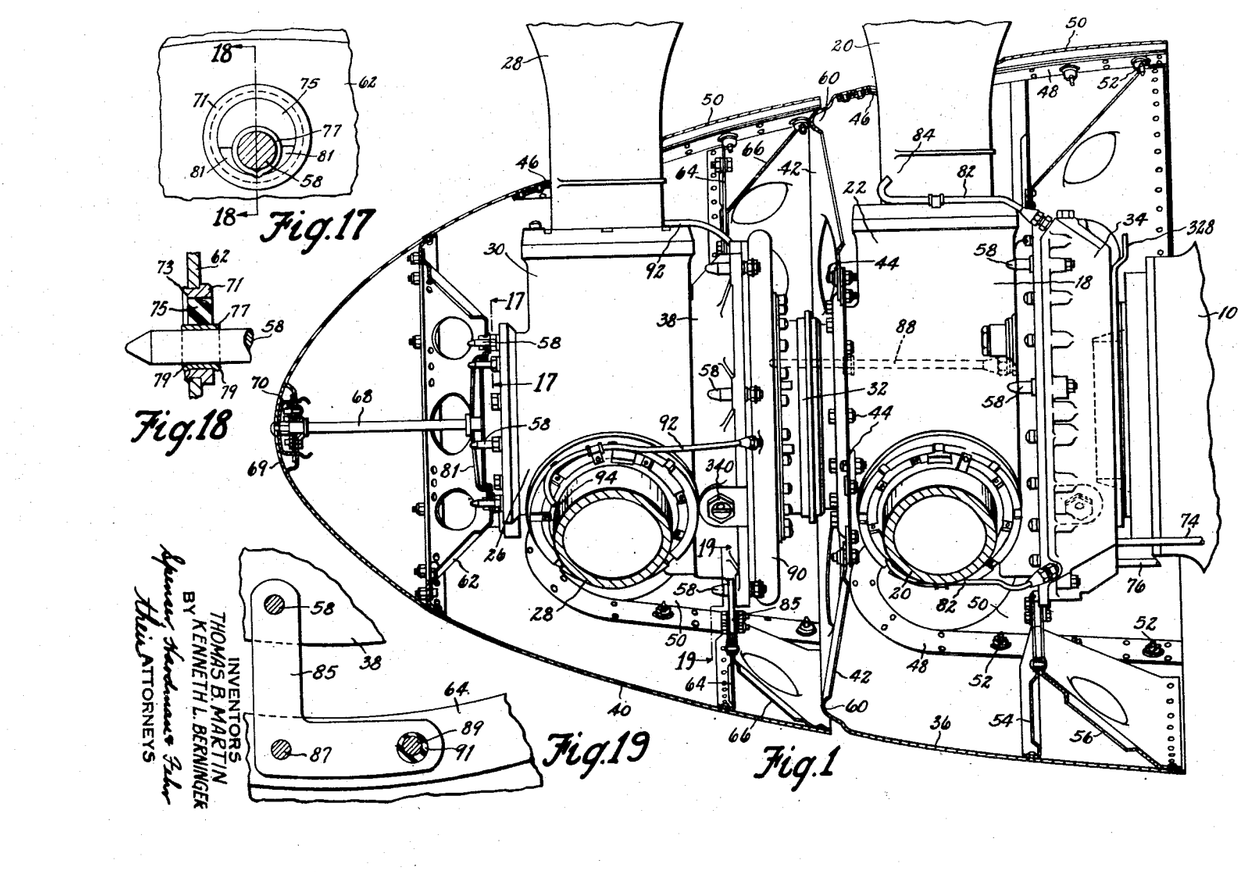
Fig. 1 is a side elevational view of a dual rotation propeller with spinner parts in section for the sake of clearness in illustration.
Figs. 17, 18 and 19 are detail views of the outboard spinner mounting.

Vibration absorbing means are adopted for supporting the spinner sections 36 and 40 and incorporate the structure as shown in Figs. 17 and 18. The circumferentially inner flange of the respective heads or webs 62, 64, 54 and 56 are apertured to receive a flanged bushing 71 which is peened over at 73 for retention purposes. The bushings 71 are of considerably larger bore than the studs or pilot pins 58 over which they are to be disposed, and bonded to the inside of the bushing there is a crescent shaped piece of yieldable material such as rubber 75 the inner arc of which is bonded to a short length of tube 77 having its edges staked at 79 to engage the inner periphery of the bushing 71. The tubular portion 77 has a bore substantially commensurate with the cross section of the pilot pin 58, or such that the two may be engaged in easy slidable engagement. Thus the pilot receiving portion of the anchorage is to one side of the center of the bushing 71, and in mounting the bushing within the spinner supporting web or head, advantage is taken of this offset relation to absorb the load of the clamping thrust in mounting. To accomplish that, the bushing is so located that the widest portion of the rubber body will be disposed radially outward of the pilot pin so that any inward flexing of the spinner shells will tend to compress the rubber section, while the lateral movement of the same may be permissible for absorption of vibration. That presents a structure in which radial outward movement of the spinner sections with respect to the pilot pins will be restrained because of the firm metallic contact or engagement on the pilot pins yet circular oscillations about the axis of propeller rotation will be permissible. That is particularly accounted for by providing the voids 81 in the rubber in the region of tube and bushing engagement substantially as shown in Fig. 17.

An alternative vibration absorbing mount is shown in Fig. 19, where an angled bracket 85 is secured to the inner periphery of the webs 64, 66 by a pivot 87 and a screw device 89 having a rubber or like bushing 91 to absorb the vibration. The other leg of the angled bracket is receptive of the pilot pin 58 carried at the rim of the regulator 38.

Thus in mounting the spinner sections, with the cover plates 50 removed, they are passed over the hub portion so that the notches 46 straddle the blades and so that the vibration supporting means each engage a pilot pin 58. In the case of the inboard propeller the forward portion of the spinner section 36 is secured to the hub 18 by the screw devices 44. In the case of the outboard propeller the spinner section 40 is passed over the blades until the vibration absorbing means engage the pilot pins 58 both on the regulator 38 and on the front portion of the hub where the forward spinner section is retained in position by the rod 68. The rod 68 threads into a plate in the forward end of the hub 26 and springing a bridge piece 81 whose outer extremities engage the inner periphery of the head member 62 to force it into seating relation against the hub face plate. With either spinner section secured in place, the cover plates 50 can be secured in place.

Figure 14:
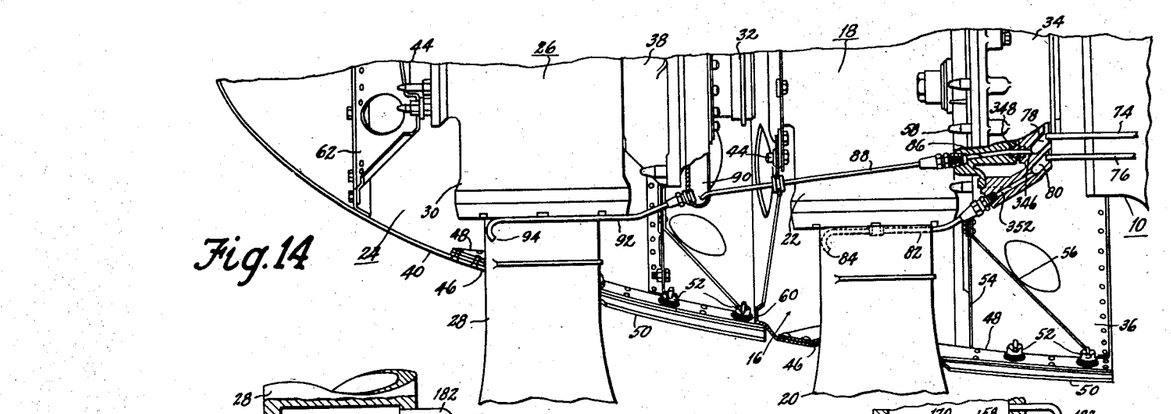
Fig. 14 is an elevational view of the dual propeller mechanism with some parts in section to show the protected circuit of the anti-icing means.

The spinner sections 36 and 40 in addition to fairing the hub portions of each propeller, provide a housing for anti-icing means or ice-inhibiting means, and protects the anti-icing medium against unwanted distribution before it is delivered to a selected point on the blade. Provision is made for conducting anti-icing fluid to the roots of the blades from a suitable reservoir and includes the transmission tubes 74 and 76 disposed to empty into a pair of slinger grooves 78 and 80 in a rotating part of the inboard propeller structure. As illustrated in Fig. 14, the slinger groove 80 connects with delivery tubes 82 that slant outwardly and curve around the root of the blades 20 to end at a point near the leading edge of the respective blade, such as indicated at 84. Connecting with the slinger groove 78 a cross-passage 86 through the regulator 34 communicates with a transmission tube 88 slanting outwardly so that centrifugal force will empty the anti-icing fluid into a slinger groove 90 provided on the outboard propeller unit, and from which, delivery tubes 92 lead out to points 94 near the leading edge on the blades of the outboard propeller. When the propeller mechanism is rotating the anti-icing medium delivered by the tubes 74 and 76 empties into the grooves 78 and 80 from whence, by the outward inclination of the connecting passages, the medium is delivered to the roots of the blades on the inboard propeller and to the groove 90 of the outboard propeller, and thence to the roots of the blades of the outboard propeller. The ends of the tubes 74, 76 and 88 are continually open and are supported closely adjacent to the grooves into which they empty, but not to be mechanically engaged thereby, that no opportunity for wind and rapidly moving air currents is afforded to carry away the fluid before it reaches the desired points of delivery. However, due to the design and support of the spinner structure, all connections of the fluid passages for the anti-icing medium are enclosed well within the confines of the spinner where the wind and air movement will have little effect upon open junctures of the passages.

For more detailed description reference is now made to Figs. 2 to 11 inclusive where there is shown the specific structure of both the inboard propeller and the outboard propeller with their respective self contained control mechanisms and interconnecting controls. Inasmuch as both propeller units are substantially alike in most details, a specific description of one, with statements of the differences of structure will suffice for both. Referring then first to Figs. 3, 5, and 8 to 10 inclusive, the inboard shaft 12 is splined at 100 to receive cooperating internal splines 102 of a sleeve 104 forming an extension on the hub 18. The end of the sleeve 104 is crowded upon a rear cone 106 by means of a forward cone 108 forced into place and withdrawn at will by a hub retaining nut 110. The nut and shaft relation is maintained by a lock device in the form of a spring ring 112 having a lug 114 disposed in a pair of registering notches 115 and 116 in the shaft and nut respectively.

The hub 18 is counterbored in the region of the nut and cone to receive a rearwardly extending end 118 of a hub cover and bearing sleeve 120 that is anchored to the hub by screw devices 122 engaging the front portion of the hub 18. Fitted within the bore of the part 120 there is the outer race of a ball bearing assembly 124 whose inner race is carried by the outboard shaft 14, further description of which will follow, in due course.

Journalled about the proximate portion of the sleeve 118 there is a blade coordinating gear 126 having a shoulder 128 seating balls 130 cooperating with a race-ring 132 fitting within a step of the counterbore for the hub 18. The gear 126, balls 130 and ring 132 constitute a separate subassembly and are retained in proper relation by means of a snap ring 134 engaging a forward extension of the coordinating gear. A sealing ring 136 stops passage of lubricant from between the parts as does a like ring 138 between the gear 126 and sleeve 118.

Meshing with the coordinating gear 126 are the blade gears 140 of all of the blades of the inboard propeller. It is understood of course that the blade gears 140 are affixed to the ends of the blades 20 that are piloted for rotation about a hub boss 142 by a bearing 144, radial thrust of the blades being taken by a stack of bearings 146 lodged in the socket 22, where they are retained by the blade retaining nut 148 and lock device 150. For rotating the blades 20, to accomplish a desired pitch shift, there are torque applying units 151 mounted within the hollow root of the blade and which comprises a cylinder 152 drivingly connected to the blade and having spiral splined engagement 154 with a skirt 156 of a piston member 158, that in turn has splined engagement 160 with a concentric and hollow spindle 162 rigidly secured to the hub boss 142, according to the nature of the structure in U. S. patent to Blanchard et al., 2,307,101, to which reference is made for more detailed description.

The torque applying unit 151 is hydraulically operated in both inward and outward movement of the piston member 158, which is accomplished by means of a tube 164 anchored in a spindle retaining nut 166 where it communicates with a chamber 168 thereby establishing fluid communication with the outside end of the piston member 158, such as at 170. Fluid communication with the chamber 172 at the inside end of the piston 158 is made by a chamber connected with a bore lengthwise of one of the dowels 174 all of which is diagrammatically shown in Fig. 15, and later to be described in detail.

Figures 2, 11, 16:
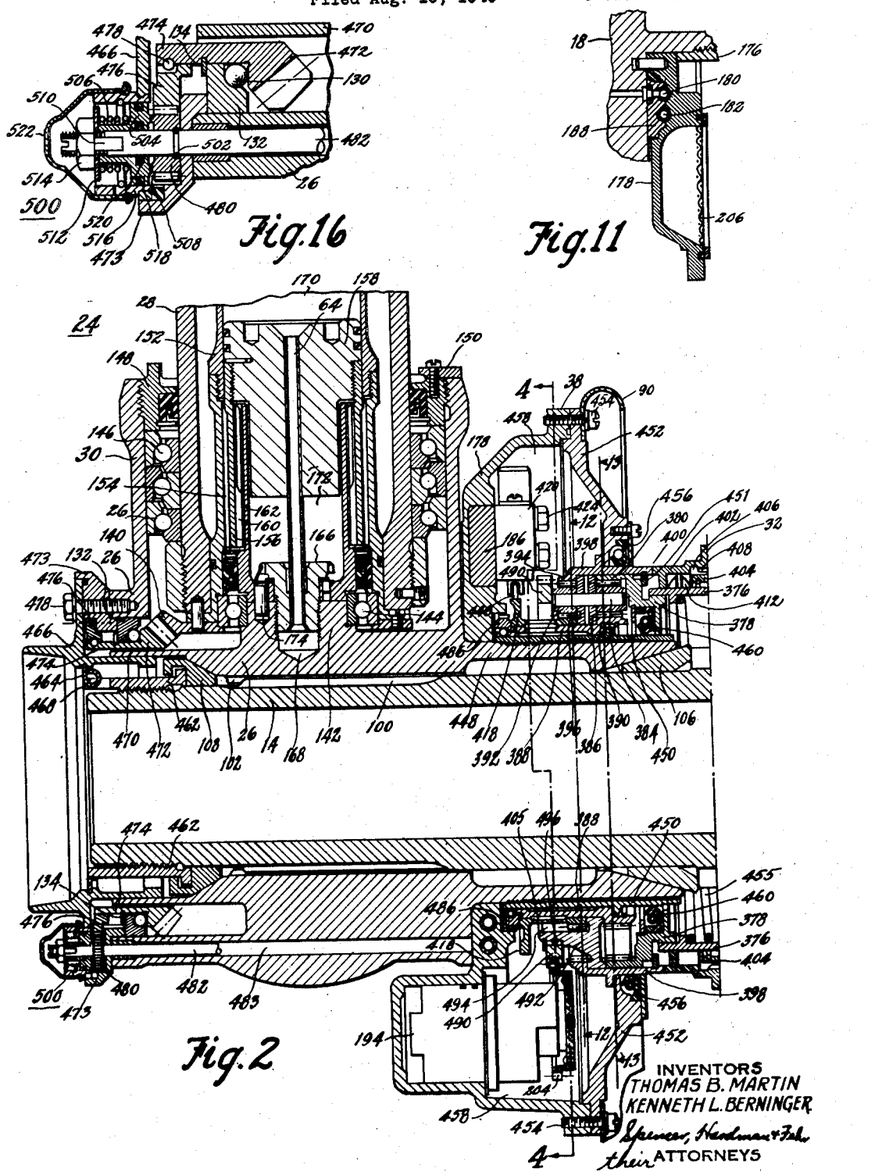
Fig. 2 is a longitudinal sectional view of the outboard propeller unit, substantially as indicated by the line and arrows 2—2 of Fig. 4.
Fig. 11 is a fragmentary view in section showing details of joining fluid passages, and the screening means for the pump substantially as indicated by the line and arrows 11—11 of Fig. 4.
Fig. 16 is an enlarged view in section of an auxiliary pitch coordinating adjustment.

For controlling the application of fluid pressure to one or the other of the chambers 170, 172, the regulator 34 is mounted on the rear portion of the hub by sliding over the outside of the extension 104 where it is held in driven and fluidtight relation by a sleeve nut 176 threaded onto the hub extension 104 somewhat as shown in Fig. 11. The regulator 34 is of the character described in the patent to Blanchard et al. 2,307,-102, and incorporates a plate 178 embracing as inserts tubular passages accommodating fluid flow to the various control units. Two of those passages are shown at 180 and 182 in Fig. 3, and each has as many ports 184 and 185 respectively leading to the torque applying units as there are blades of the propeller assembly to be controlled, in this case three each.

Figures 4, 6, 7:
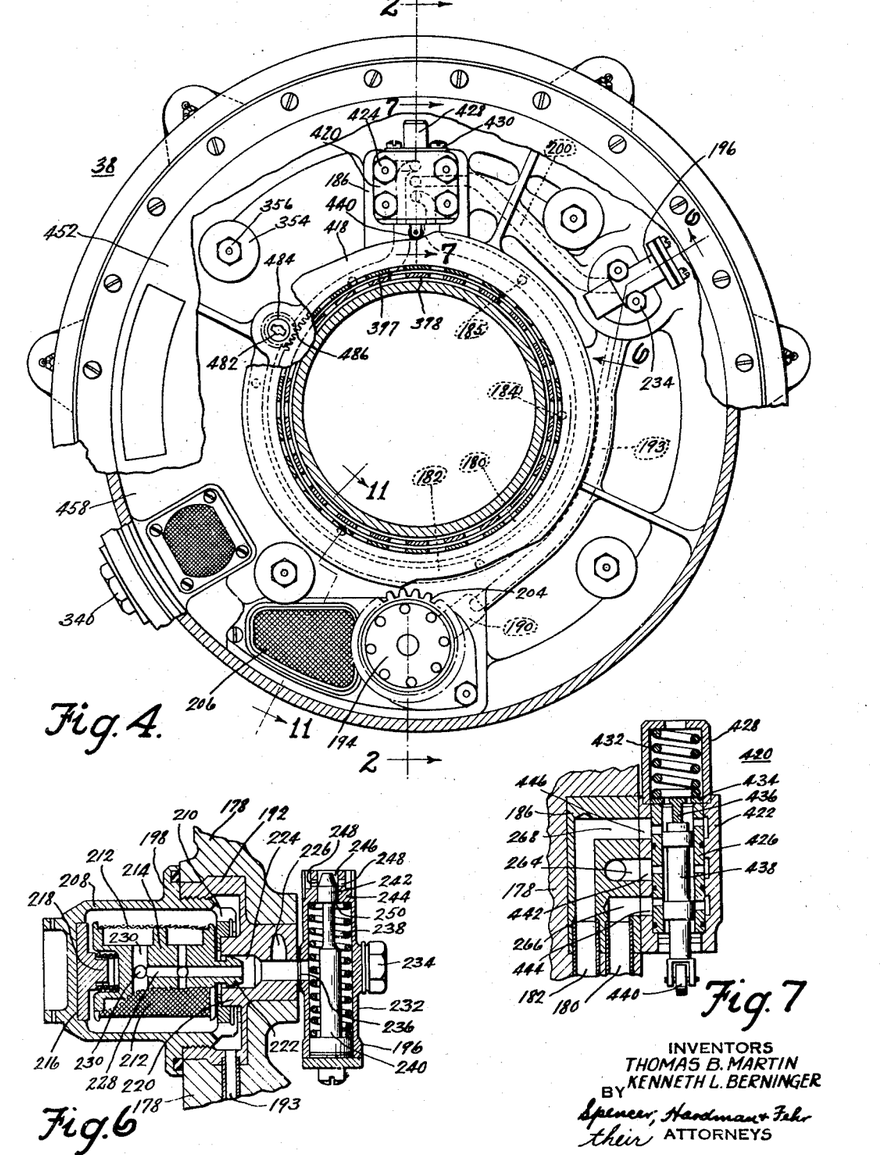
Fig. 4 is a transverse sectional view through the regulator mechanism of the outboard propeller substantially as indicated by the line and arrows 4—4 of Fig. 2.
Fig. 6 is a sectional view through the filter means and the pressure limiting means substantially as indicated by the line and arrows 6—6 of Fig. 4.
Fig. 7 is a sectional view through the control valve unit of the outboard propeller regulator substantially as indicated by the line and arrows 7—7 of Fig. 4.
Figures 5, 8, 9, 10:
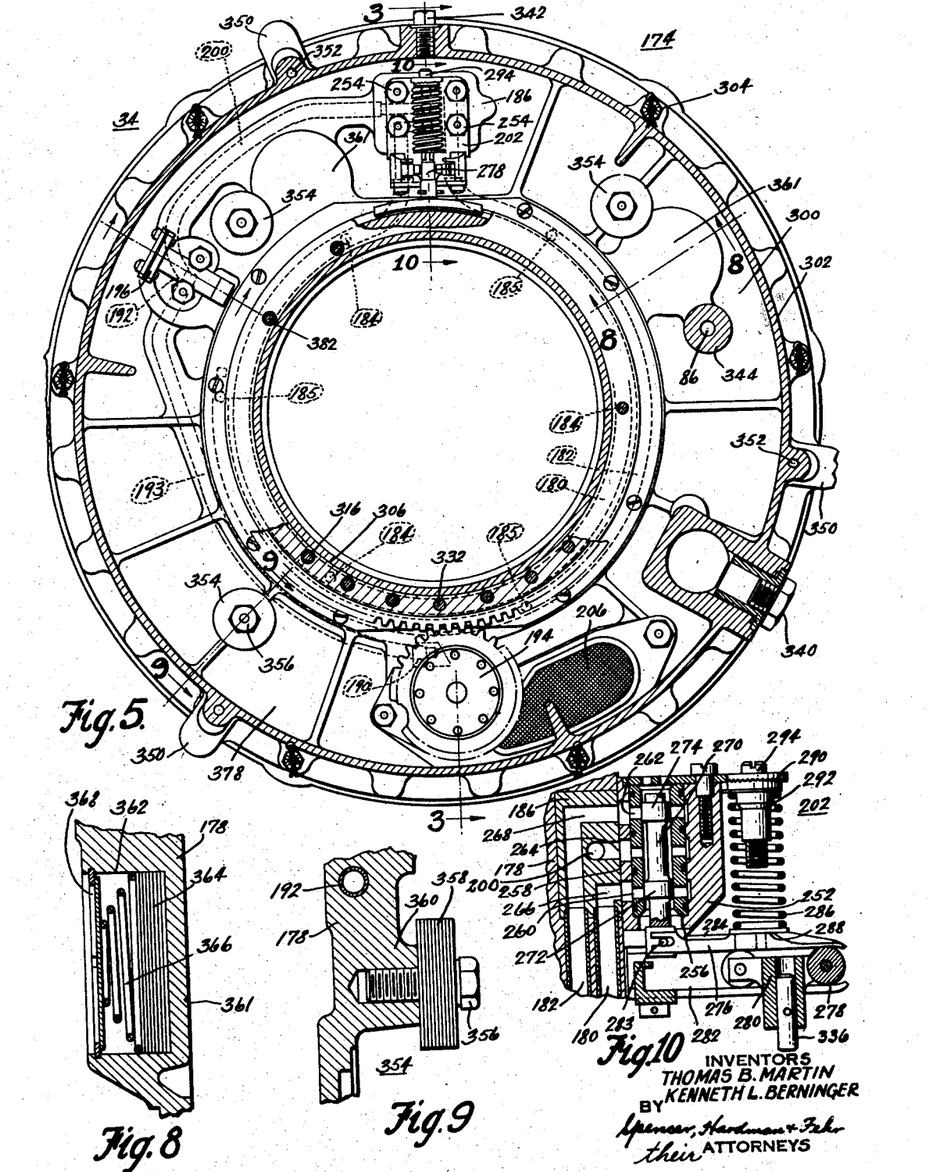
Fig. 5 is a transverse sectional view through the regulator mechanism of the inboard propeller substantially as indicated by the line and arrows 5—5 of Fig. 3.
Figs. 8 and 9 are detailed views in section, showing balance means substantially as indicated by the lines and arrows 8—8 and 9—9 respectively of Fig. 5.
Fig. 10 is a sectional view through the control valve governor unit of the inboard propeller regulator substantially as indicated by the line and arrows 10—10 of Fig. 5.
Figure 12:
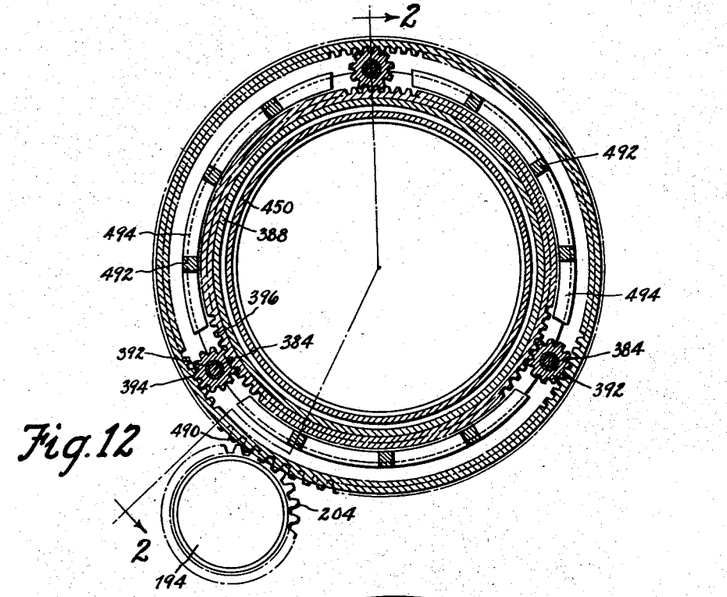
Fig. 12 is a transverse sectional view through the blade shift coordinating means substantially as indicated by the line and arrows 12—12 of Fig. 2.
Figure 13:
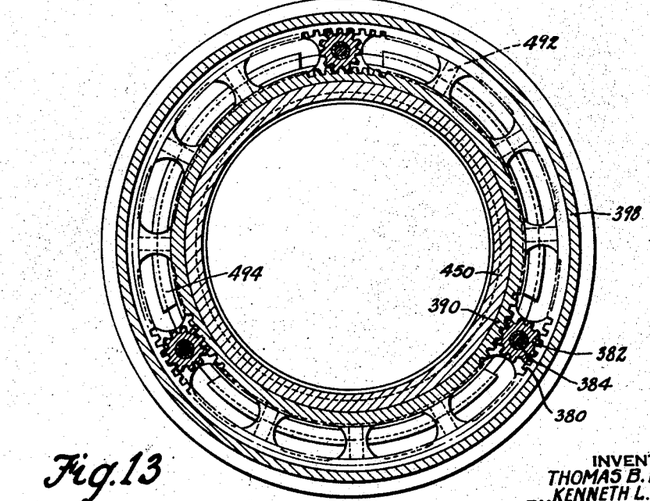
Fig. 13 is a similar view taken along the line and in the direction of the arrows 13—13 of Fig. 2.

In making the regulator plate 178 it is the practice to form and lay out in the desired contour, tube sections to form the fluid passages and bond them to junction and mounting pads similar to the showing in Fig. 5, where the aforementioned tubes 180 and 182 are shown in dotted lines extending from a mounting pad 186 to curve around the shaft opening of the plate and connect with pads 188 through which open the ports 184 and 185, respectively. Other pads as 190 and 192 operate to secure the ends of a pressure supply tube 193 extending from a pump stationed at 194 to a pressure control valve 196 and strainer or filter unit 198 shown in Fig. 6. From the mounting pad and juncture block 192 another tube section 200 extends to the mounting pad 186 upon which is mounted a governor valve assembly 202 having fluid connection with the tube sections 180, 182 and 200, substantially as shown in Fig. 10. In production it is the custom to embed all tubes and mounting pads in the body of the regulator plate, so that fluid is doubly protected against leakage.

The pump unit 194 is mounted in a well or pocket of the regulator plate 178 and has a driven gear 204 responding to rotation of the propeller for taking up oil or other hydraulic fluid from a screened chamber 206 and delivering it into the tube section 193 for delivery to the filter unit 198 shown in Fig. 6. The filter unit comprises a cup or casing 208 threaded into a large bore of the mounting pad 192, and terminates in a slitted flange 210 through the slits of which the pressure fluid from 193 flows to the interior of the casing where it engages the screening 212 around a spool 214. The spool is socketed at 216 to receive a spring, and pilot over a boss 218 on the inside of the head of the casing 208, the spring operating to keep the spool against a boss 220 of the mounting pad 192 where a stud 222 enters a bore 224 communicating with the tube section 200 at 226. The stud 222 is bored at 228 to intersect cross bores 230 in the spool such that pressure fluid passing through the screening 212 may enter the cross bores 230 thence the bore 228, 224 and 226 to the tube section 200. The casing 208 may be removed from the plate 178 whereupon the screen and spool assembly is removable for cleaning.

The control valve or pressure limiting means 196 constitutes a tubular casing 232 secured to the mounting pad 192 by screw devices 234 and has a side aperture 236 therethrough in registry with the bore 224 communicating with the pressure line between the pump and the governor valve. The bore of the casing houses a spring 238 and a headed plunger 240 that ends in a valve land 242 slidable through the apertured head 244 of the casing. The aperture 246 of the casing head has cross bores 248, which, when the plunger moves against the spring 238 by reason of pressure on the annular shoulder 250, opens the bore of the housing and thus the pressure line to the outside of the casing. The annular shoulder 250 is always subject to the fluid pressure created by the pump 194 and present in the pressure lines 193 and 200 leading to the governor valve unit 202, and on the development of unduly high pressure will move to a point where the pressure will be relieved through the cross bores 248.

The governor valve assembly is illustrated in section in Fig. 10 and comprises a body 252 mounted on the pad 186 by screw devices 254, and houses a porting sleeve 256 apertured at 258, 260 and 262 for communication with passages 264, 266 and 268, in turn communicating with the pressure line from 200 and the control passages 180 and 182 respectively. Movable along the bore of the porting sleeve 256 there is a valve plunger and centrifugally responsive member 270 that has lands 272 and 274 normally stopping fluid flow from the port 258 to either of the ports 260 and 262. To control the movement of the valve plunger 270 there is a lever 276 resting on a fulcrum roller 278 mounted on a carriage 280 movable along guide ways 282, and the lever has notch and pin engagement 283 with the one end of the valve plunger while a leaf spring 284 secured to the body 252 by the ends of the ways 282, maintains the lever and plunger relation free from binding. A compression spring 286 rests on a pad 288 provided by the lever and exerts its thrust from a ratchet plate 290 fixed to the end of the body. A screw threaded collar 292 seating that end of the spring and piloted by a screw stud 294 provides for adjusting the force of the spring applied to the lever and thus controls the opposition of the spring to the movement of valve by centrifugal force.

The pump 194, the filter unit 198, the pressure relief unit 196, and the governor valve assembly 202 constitute control elements of the hydraulic system and are all mounted on the regulator plate 178, and all except the filter unit are mounted on one side thereof so as to be contained within a reservoir 300 constituted by the regulator plate 178, and a cover member 302 secured thereto by screw devices 304, both plate and cover member having bearing rings 306 and 307 at their inner peripheries journalling a sleeve member 308 extending from an adapter assembly comprising a guide ring 310, a control ring gear 312, and a face plate 314 held in assembly by screw devices 316. Centrifugally operated fluid seals 318 and 320 are also carried by the plate and cover member and are adapted to engage while at rest, the ends of the sleeve 308. The adapter assembly is substantially concentric of the sleeve nut 176 retaining the regulator plate on the hub extension, but is sufficiently larger to be capable of weaving with respect thereto. The adapter assembly is restrained against rotating with the regulator 34 by means of a radially extending lug 322 lodged in a notch 324 of a piloting flange 326 secured to the end of the engine nosing 10. Thus, rotation of the shaft 12 which carries the inboard propeller along with the regulator, rotates the regulator about the adapter assembly which is maintained against turning by the lug 322 in the notch 324.

Figure 3:
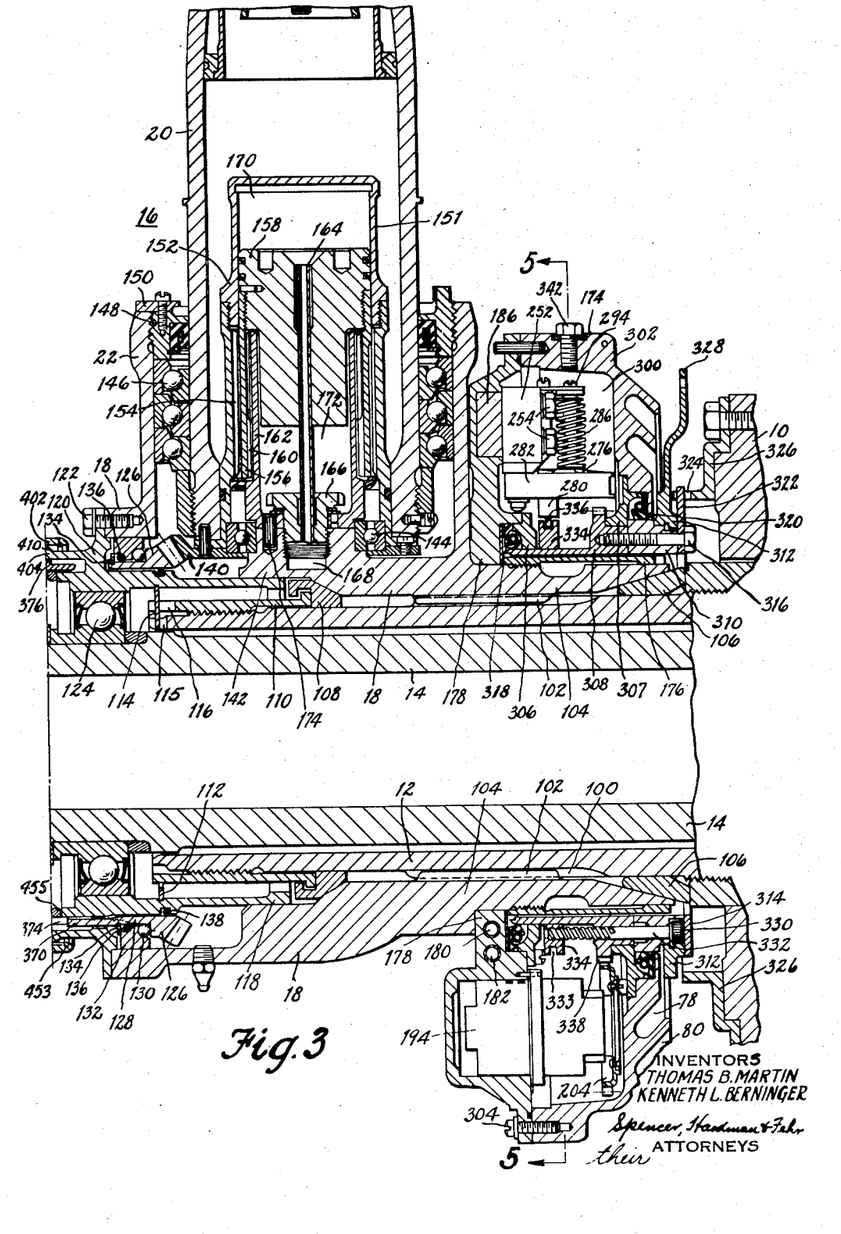
Fig. 3 is a similar view of the inboard propeller unit, being a view as seen along the line and in the direction of the arrows 3—3 of Fig. 5.

A lever 328 on the control ring gear 312 has provision for linkage to a manual in the cockpit by which the ring gear may be rotated or oscillated around the guide ring 310 for rotating pinions 330, by which the high lead screw shafts 332 thread into a control ring 334, whose groove 333 is traversed by a shoe 336 of the carriage 280. Rotation of the ring gear 312 and the screw shafts 332 cause an axial movement of the control ring 334 relative to the sleeve 308 and carries with it the shoe which moves the carriage 280 along the ways 282. The fore and aft position of the carriage determines the distance of the fulcrum 278 from the line of spring pressure and the connection with the valve plunger, and therefore determines the moments of the centrifugal and opposing applied forces to the lever and valve, thereby determining the speed level at which the governor valve unit will come to equilibrium, and hence the speed level at which automatic control will be effected. When it is so desired, the fulcrum may be moved to the opposite side of the line of spring pressure, whereby the opposing forces acting on the valve plunger 270 will be so altered that the valve 270 will take up and remain in a position for connecting the torque applying units to the source of pressure for feathering the blades. That position of the carriage and control ring is shown in Fig. 3, while the position of normal operation is shown in Fig. 10.

The adaptor sleeve 308 embodies a toothed flange 338 that engages the pinion 204 of the pump 194 to effect its operation when the propeller is rotating. The pump and driving mechanism therefor is all inclosed in the reservoir 300 as is all of the control elements of the apparatus, and, due to the presence of hydraulic fluid with which the reservoir is charged, is continually bathed in the fluid which effects a cooling of the units subjected to high pressures. A filler plug 340 located in the peripheral wall of the cover 302 facilitates charging the reservoir with the proper amount of fluid, and a second plug or screw 342 disposed over the governor adjusting screw 294 makes it convenient to adjust the governor spring 286 from without the regulator housing. The regulator plate 178 also embraces one or more bosses 344 extending across the reservoir to meet the inner surface of the cover 302, and provides the passage 86 heretofore described that aligns with a passage 346 in the cover leading to the slinger ring groove 78, a compressible sealing ring 348 preventing leakage at the juncture. In turn the cover 302 provides circumferentially spaced ribs 350 cored out at 352 to communicate with the groove 80 and open to the anti-icing tubes 82.

Disposed at strategic points on the inside of the reservoir there are located on the regulator plate 178 balancing assemblies 354 comprising a screw device 356 and a plurality of shims or weight members 358 for mounting on bosses 360. The regulator plate with its assembled structure may be balanced before attaching the cover by adding or removing the necessary or required number of shims to the proper boss. An appropriate number of balancing stations 361 are provided to be accessible from the outside of the regulator plate, and comprise wells 362 within which are disposed shims or discs 364 held in place by a spring 366 engaging a snap-ring or similar device 368. By this construction final balance of the propeller structure may be accomplished by adding to or removing from the stations 361 after the regulator is closed and mounted on the hub with the associated blades.

The inboard propeller thus constituted is a self contained unit of hydraulic control capable of automatic operation for controlling the pitch of the propeller blades for constant speed operation. The speed at which the control is to be effected may be selected by the lever 328 and its linkage to the cockpit, and when selected, the valve member 270 will assume the equilibrium position at the new speed level in response to the balance of centrifugal force and spring force on the lever 276. Should there be a condition of overspeed, then the valve member 270 will move radially outward due to the dominance of centrifugal force over spring force, and open the pressure line from the pump to the passage 182 which leads to the side of the torque applying unit adapted to increase the pitch of the blade. Likewise, if there is a condition of under speed, then the valve member 270 will move radially inward due to the dominance of spring force, which movement opens the pressure line to the passage 180 leading to the side of the torque applying unit for reducing the pitch of the blades. In either instance, the setting of the blade pitch is quickly and effectively corrected for maintaining the propeller operation at a constant speed. Whenever the pitch of the blades is changed there is a rotation of the blades about their bearings 144 and 146 with a consequent rotation of the coordinating or master gear 126, since each of the blade gears 140 driven by the shifting blade mesh with it. Therefore, all of the blades change an equal amount.

The construction of the whole mechanism is such that any pitch change of the inboard propeller is an initiating force for coordinating a like change in the outboard propeller mechanism. Means are therefor provided for introducing the pitch shift of the inboard propeller to the control mechanism of the outboard propeller, which is likewise self contained and automatic in operation in response to a change of blade pitch occurring in the inboard propeller. The means for introducing that change is embodied in the interconnecting mechanism 32, as shown diagrammatically in Figs. 15 and 20, and begins with the coordinating gear 126 of the inboard propeller, which has a plurality of long tongues 370 extending axially foreward through slots 372 of the bearing sleeve 120 to engage in notches 374 of a sleeve or coupling 376 which in turn engages, for rotary driving relation, a ring 378 having a ring gear or circular rack 380. The ring gear 380 is an internal one, and meshing with it are a plurality of pinions 382 journalled on cross pins 384 secured in circumferentially spaced relation about a spider 386 that is journalled about a sleeve or the like 388 having an exterior toothed flange 390 meshing with the pinions 382.

Assuming for the time being that the sleeve 388 is relatively fixed, it will then be appreciated that rotation of the coordinating gear 126 will eventually rotate the rack 380 which causes rotation of the pinions 382 and their rolling over the exterior rack 390. That rolling movement causes the spider 386 to rotate relative to the sleeve 388, and in so doing carries with it a second set of pinions 392 each of which mesh with two ring gears or racks 394 and 396. The rack 394 is carried by an outer sleeve 398 journalled about the spider 386 and ring 378 and has tongue and notch engagement at 400 with a selecting or coupling sleeve 402 engaging about a tubular extension 404 from the bearing sleeve 120 of the inboard propeller hub. The inner surface of the selecting sleeve 402 provides an annular groove 406 and a set of splines 408 adapted to mesh with a set of cooperating teeth 410 on the exterior of the extension 404. To maintain the selected tooth and spline relation of the members 402 and 404 a compression leaf spring or the like 412 is so disposed between them as to engage and be compressed between flanges 414 on the selecting sleeve and flange 416 on the sleeve 376.

However, the selecting sleeve 402 is capable of aft axial movement against the spring 412 to disengage the tooth and spline engagement, or such that the teeth of the extension are disposed in the notch or groove 406, whereupon the selecting sleeve may be rotated relative to the bearing sleeve extension for a purpose later to be described. Suffice it here to say, that, under a state of rotation the members 398, 402, 404 and 120 all are rigid with and rotate with the inboard propeller, and that pitch shifting of the blades causes relative rotary movement between those members and the train of elements extending from and coupled with the coordinating gear 126 to the spider 386. Still assuming that the sleeve 388 is fixed against rotation, as is also the rack 394 and a sleeve 405 supporting the rack 396, it will further be appreciated that rotary movement of the spider 386 will roll the pinions 392 over the rack 394 and cause a resultant rotation of the sleeve and rack 405 and 396 relative to the sleeve 388.

Advantage is taken of that relative rotary movement of the sleeves 388 and 405 to initiate a pitch shift of the blades carried by the outboard propeller, and embraces a cam flange 418 adapted to actuate a valve of a control unit 420, the details of which are shown in Figs. 2, 4 and 7. The control unit here involves a block 422 mounted on the regulator plate 178 over the mounting pad 186 by screw devices 424, and contains a porting sleeve 426 held in place by a spring cup 428 and screw devices 430. Housed within the spring cup there is a compression spring 432 engaging an apertured plate 434 having a stem 436 adapted to press upon a valve plunger 438 guided within the porting sleeve to keep its roller 440 in rolling contact upon the cam flange 418 of the initiating mechanism. The porting sleeve and block provide ports or openings 442, 444 and 446 for fluid connection with the passages 264, 266 and 268 respectively, as in the case with the inboard propeller regulator. In fact, the construction and arrangement of the parts of the outboard propeller and regulator is essentially the same, except for a few items, as that for the inboard propeller and regulator, and therefor should need no further description other than to point out the differences.

It should then suffice to say that, the regulator for the outboard propeller contains such elements of control mechanism as the pump 194, pressure limiting means 196, filter means 198, control unit 420 and the fluid passages 180, 182, 192 and 200 connecting them, along with the balance means 354 and 361. The regulator is mountable on the hub sleeve extension 448 where it is held in place by a sleeve nut 450. The principal parts of the interconnecting mechanism 32 are included as part of the outboard propeller assembly, while the coupling elements 376 and 402 are assembled with the inboard propeller.

In the actual construction as shown in Fig. 2, a snap ring 451 lodged within the end of the sleeve 398 prevents removal of the ring 378 when the inboard and outboard propeller assemblies are separated. In like manner a spring ring 453 lodged within the end of the coupling member 402 prevents separation of the parts 402 and 404 under the urge of the spring 412. A spring 455 seated against a part of the inboard hub presses axially against a flange 457 of the sleeve 376 for maintaining driving relation between the members 376 and 378, but separation of the coupling member 376 from the extension 370 of the coordinating gear 126 is prevented by the spring 412 interposed between the flange 414 of the coupling member 402 and the flange 416 of the coupling member 376, such that installation of the outboard propeller on its shaft will first effect engagement and meshing of the driving relation on the one hand between the ring 378 and coupling member 376, and on the other hand between the ring 398 and the coupling member 402, all before the hub 26 is sealed on its rear cone 106. That means that the coupling members 376 and 402 will both be moved axially toward the engine nose 10 to slightly compress the springs 412 and 455 which maintain the engaging and driving relation despite differences in axial or lineal spacing of the propeller hubs.

Disposed over the control elements of the outboard regulator there is an annular cover plate 452 held in place by screw devices 454 and providing an annular seal 456 adapted to bear upon the outside of the sleeve 398, which, it is to be recalled, is rotatably supported from the inboard propeller hub, and in consequence thereof rotates in the opposite direction from the regulator. That construction provides a reservoir 458 within which is enclosed the control elements of the outboard propeller and a goodly portion of the initiating mechanism. To perfect a seal against leakage from this reservoir an annular seal 460 is disposed within the ring 378 so as to engage the sleeve nut 450, and, like the seal 456, is adapted when the propeller is in operation to lift off from the engaged part due to centrifugal force.

Like the inboard propeller, the outboard propeller mechanism is complete in itself to the inclusion of the regulator, and a contributing part of the interconnection mechanism. In mounting it upon the shaft 14, it is crowded upon the rear cone 106 by aid of the forward cone 108 and a shaft engaging nut 462 where it is held to be driven by the cooperating splines 100 and 102 due to a lock device consisting of a snap or spring ring 464 seated in a groove of a face ring 466, indexed and secured to the forward end face of the hub 26. The snap ring has a rolled tongue 468 for disposition in radially aligned notches or slots of the nut and ring. The hub in this instance is projected forward of the blade bearing boss 142 to provide a sleeve 470 which pilots a coordinating gear 472 meshing with all of the blade gears 140 of the outboard propeller. Like the inboard propeller this coordinating gear is supported from the hub casting by the ball race 132 which is kept in place by a flanged spacer ring 473 inserted between the hub 26 and the face ring 466, and the coordinating gear has a tubular extension 474 on which is mounted in driven relation a spur-gear 476 by means of a ball key 478. The gear 476 being of the external type meshes with one or more pinions 480 carried by a shaft 482 disposed in a bore 483 of the hub and extending rearwardly to project into the reservoir 458 where it carries a second pinion 484 meshing with a toothed flange 486 drivingly connected or keyed to the aforementioned sleeve 388.

The gear connection between the sleeve 388 and the pinion 484 to the coordinating gear 472 is irreversible so that, unless initiating movement is delivered to the spider 386, the sleeves 388 and 405 rotate in the same direction and with the regulator of the outboard propeller. Due to the driving relation of the interconnecting mechanism by the inboard propeller the internal racks 380 and 394 rotate in one direction at the same speed, assuming of course that no pitch shift is being effected in the inboard propeller. That causes the pinions 382 and 392 to rotate in the same direction at the same speed and in doing so roll over the two external racks 390 and 396 which are rotating at equal speeds in the same direction but in the opposite direction to the rotation of the racks 380 and 394. In consequence of that there is no relative rotation between the sleeves 388 and 405 and thus no shifting of the valve 438 of the outboard regulator. Due to the opposite rotation of the internal racks relative to the external racks, the carriage 386 supporting the pinions 382 and 392, which in effect are planet gears, remains substantially stationary as to rotation relative to either set of racks. Advantage is taken of this to support a pump driving gear 490 on arms 492 extending axially from the carriage 386 and having connecting webs 494 extending arcuately between the pinions 392. The driving relation between the gear 490 and the webs 494 may be perfected by a ball key as shown at 496 in Fig. 2. It will then be observed that rotation of the outboard propeller causes its regulator to rotate about the gear 490, which, due to the meshing with the pump gear 204 of the pump carried by it, effects driving of the pump 194, that in turn develops fluid pressure for the working of the control units of the outboard propeller mechanism.

Upon the occurrence of a change of pitch of the blades of the inboard propeller, relative rotation is effected between the coordinating gear 126 and the sleeve 404 which causes relative rotation between the interior racks 380 and 394. The relative rotation of the racks 380 and 394 produces a differential rotation of the pinions 382 and 392 which translates the blade shifting movement of the inboard propeller to relative rotation between the sleeves 388 and 405. It is in fact the sleeve 405 that rotates relative to the sleeve 388 due to the irreversible gearing of the latter with the pinion 484. The relative rotation of the sleeve 405 carries with it the cam flange 418 that causes an inward or outward movement of the valve member 438, depending on the direction of rotation of the sleeve 405 relative to the sleeve 388. Thus, if an increasing pitch shift is effected for the inboard propeller the valve 438 will shift to effect a similar and equal pitch shift in the outboard propeller. As the pitch shift is effected in the outboard propeller, the blade gears 140 thereof will rotate the coordinating gear 472 and with it the spur-gear 476 that drives the shaft 482 for rotation of the toothed flange 486. The toothed flange acts somewhat as a follow up device, in that it is thereby rotated in the reverse direction and carries with it the sleeve 405 which produces a reverse and equal rotation of the pinions 382 and 392, so that a retraction of the sleeve 405 brings the cam crest back to a position where the valve 438 will again occupy the equilibrium position.

Figure 20:
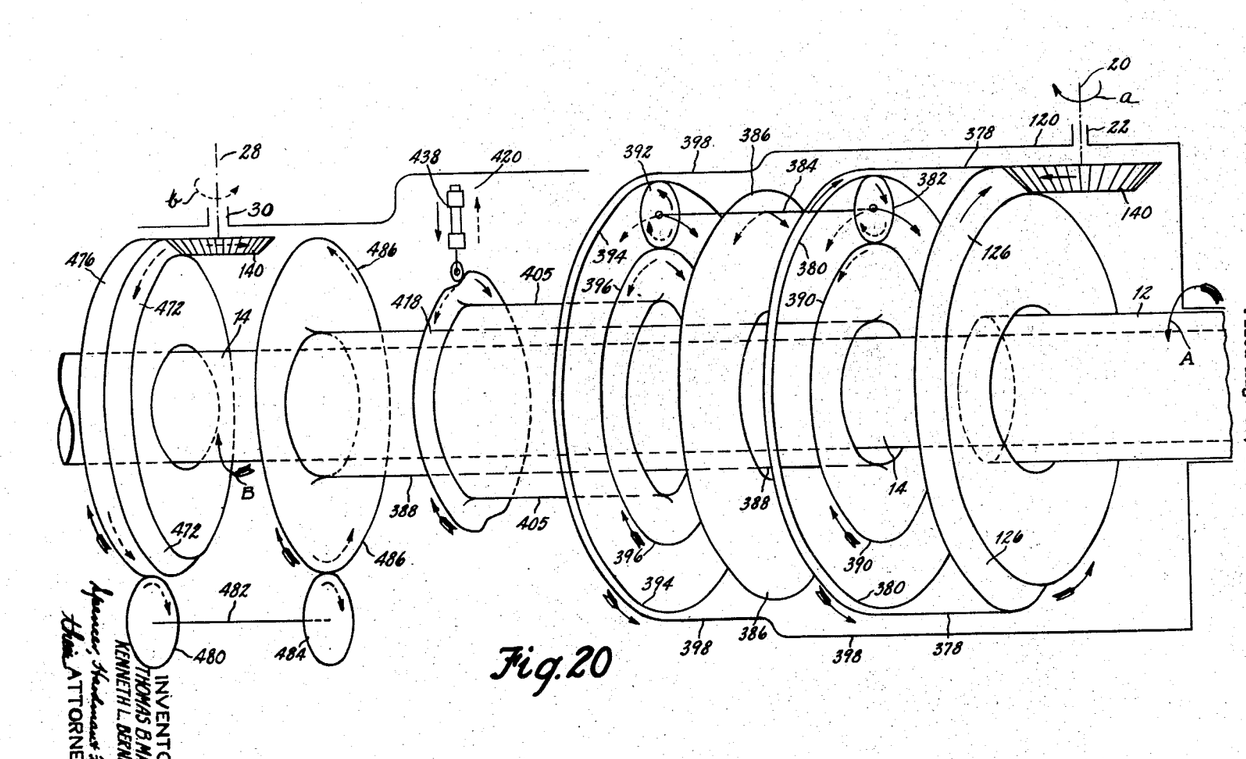
Fig. 20 is a schematic view depicting the gear train for the blade pitch control in its simplest embodiment.

Operation of the interconnecting mechanism will be more apparent when reference is made to Fig. 20 in connection with the following brief description, and where it is to be assumed that the propeller mechanism, if under a state of operation, would manifest in a group rotation for the inboard propeller elements in the direction of the feathered arrow A, and a group rotation of opposite direction for the outboard propeller elements in the direction indicated by the feathered arrow B. That is assuming that the propeller mechanism is operating at substantially constant speed and that there is no pitch shift being made. Under those conditions each of the elements of the respective inboard and outboard propellers are rotating as a fixed member with the shafts 12 or 14 and in the direction of the feathered arrows placed outside of the particular element near the bottom of Fig. 20. Thus, with the shaft 12 and rotating in the same direction and at the same speed there are elements 126, 378, 380, 120, 398 and 394 which effect revolution of the elements 140, 22 and 20 in the direction of arrow A, while rotation of the shaft 14 in the opposite direction as indicated by the arrow B effects revolution of the elements 28, 30, 438, 480, 482 and 484 in an opposite sense. Also, rotating with the shaft 14 at the same speed and in the same direction are the elements 472, 476, 486, 388, 390, 418, 405 and 396 all as indicated by the feathered arrows near the bottom of the figure and just outside of the element. As a result, under constant speed operation, both sun-gears rotate in the same direction but in a direction opposite to the direction of rotation of the internal gears, which permits the spider 386 and pinions 382 and 392 carried by it to stand still with respect to either shaft. That is significant by the fact, no feathered arrow has been applied to the element 386.

Considering a blade pitch increase on the inboard propeller as indicated by the solid unfeathered arrow a applied to the blade 20, the blade gear 140 will be rotated in the direction of the solid arrow thereon and will effect relative movement of the elements of the interconnecting mechanism as indicated by the solid arrow applied to each element so affected. This, it will be noted, will cause a clockwise rotation of the elements 126 and 380 which is opposite to the direction of inboard propeller rotation indicated by the feathered arrows, and in the same direction as the outboard propeller rotation. As a result, the pinion 382 is also rotated clockwise as indicated by the solid arrow thereon so that it rolls along the sun-gear 390 and carries with it the spider 386 and the pinion 392, all of which move in a clockwise direction as indicated by the solid arrows. The pinion 392 however, rotates in a counter-clockwise direction since it rolls on the internal gear 394 and therefore drives the sun-gear 396 to rotate in a clockwise direction. The cam 418 thereto attached backs away from the valve 438 which admits fluid to the torque unit of the blades in the outboard propeller which operate to shift the blades for an increase pitch as indicated by the dashed line arrow b applied to the blade 28. Consequent upon that shift the blade gear 140 rotates in the direction of the dashed arrow thereon, which movement is transmitted to the elements 472, 476, 480, 484, 486, 388 and 390 in the direction of the dashed arrows applied thereon. The internal gears 380 and 394 now act as fixed racks and the relative rotation of the sun-gear 390 effects clockwise rotation of both pinions 382 and 392 about their shafts 384, and rolling of the pinions over the internal gears to rotate the spider 386 in a counter-clockwise direction as indicated by the dashed arrows. The pinions, the sun-gears and the internal gears being of equal diameter, and there being no relative rotation of the internal gears, then there is no relative movement between the elements 486 and 418, which allows the cam to restore the equilibrium position of the valve 438, at which time there will be cutting off of the pitch shifting movement. An initial shift for blade pitch decrease can be similarly traced, it being understood that then the unfeathered arrows would each be reversed in direction.

In designing the dual rotation propeller, steps have been taken to keep each propeller a self contained hydraulically actuated unit controllable for operation at a constant selected speed, with interconnecting means for coordination of the blade angle between the two propellers that is independent of the relation, fore and aft position, of the two propellers, and so cyclical without limits of travel as to avoid breakage or damage due to maladjustments, yet sensitive to alteration or adjustment to suit reuirements in service. Provision is made for linear difference in blade angle between the two propellers by a simple change in gear ratio, and for eccentricity and misalignment between the propeller shafts, and between the propeller shafts and engine nose. Coordination of the blade angle between the two propellers is easy to accomplish and check at each installation, or between installation and removal, and installation of the propellers is relatively simple.

Figure 15:
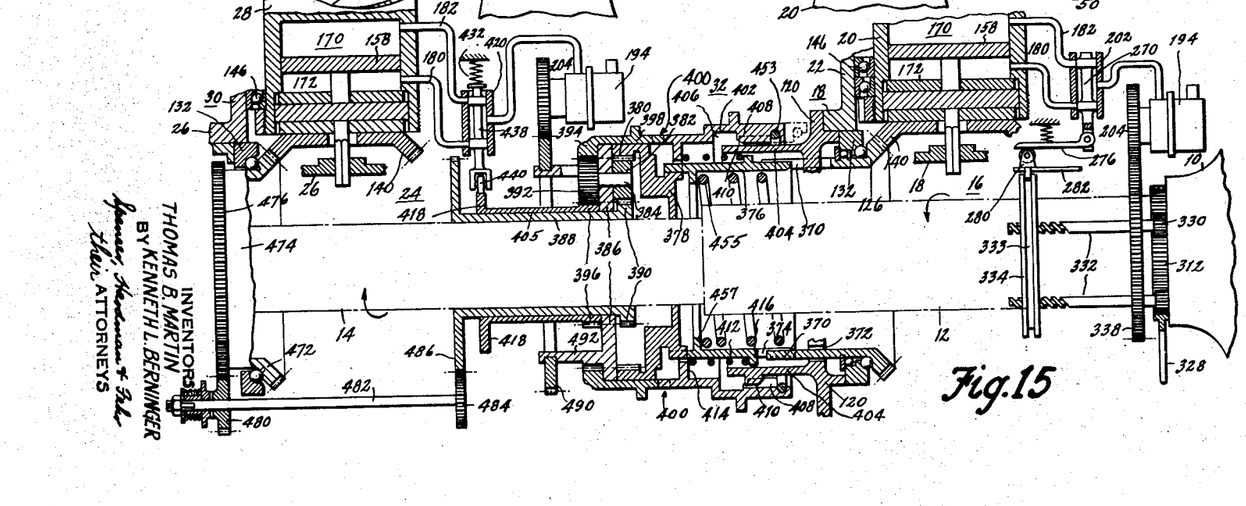
Fig. 15 is a simplified diagrammatic view showing the functional relation of the essential elements of the propeller mechanism, without regard to the exact configuration or scale of the contributing parts.

The arrangement chosen to do the job of coordinating the blade angle of one propeller with the blade angle of the other propeller is a small planetary transmission located within the regulator of the outboard propeller. Referring to Fig. 15 there are two identical gear trains in this transmission. One of these trains begins with the geared member 398 which is connected to the inboard hub by the coupling member 402. Planet pinion 392 carried by the spider 386, meshes with 394 to control the angular position of the gear 396. This gear 396 carries a cam surface 418 at its forward end which engages the piston of the distributor valve 438 by means of a roller follower 440. The other gear train begins with the geared member 378 which is connected to the inboard master gear 126 by the coupling member 376. Planet pinions 382 mesh with the gear 380 and the gear 390 in order to determine the position of the spider 386. The gear 390 is connected to the master gear 472 of the outboard propeller through an additional train of gears beginning with the gear 476 mounted on the master gear flange. Gear 476 drives pinion 480 splined to shaft 482 which enters the regulator and carries a pinion 484 similar to 480 splined to its end inside the regulator. This pinion 484 meshes with the gear 486 keyed to the forward end of the gear 390. In operation, therefor, we have a planetary system which will coordinate the positions of four different members at the same time that two of the members rotate together in one direction and the other two may rotate in the opposite direction. The spider, then, which is the backbone of the assembly, and forms the bearing support between the members 398 and 388 rotates at nearly the mean speed which is 0 R. P. M. in this case. The rubbing speed of the bearings then remains the same as that of the regulator bearings for single rotation. The pump drive gear 490 is also mounted on the spider 386 thereby providing a stationary gear by which the pump can be driven in the same manner as in the conventional regulator without resorting to extreme gear ratios.

In operation the propellers are installed with the blades of the inboard propeller at the low pitch stop without regard to coordination of blade angle. The coupling members 402 and 376 engage the transmission members 398 and 378. The coupling member 402 is then disengaged by moving it inboard against its spring until the splines 408 and 410 also disengage. It can be held in this position by end-to-end engagement of the splines. The member 398 is then rotated until the cam rise 418 (see also Fig. 4) engages the roller follower of the distributor valve. The coupling member 402 is then indexed correspondingly and released to reengage with 398. With the propellers stationary, oil pressure is supplied externally to the outboard regulator by means of a hand pump through an appropriate fitting (not shown). The blades of the outboard propeller will then move to a position corresponding to equilibrium position of the distributor valve. Index marks provided on the blades of the outboard propeller will then show whether or not the blade angles of the two propellers are in agreement. The coupling member 402 can then be re-indexed and the process repeated until agreement is obtained. A vernier relation between the splines 408 and 410 and the lugs connecting 402 and 398 will give a blade angle adjustment to within .2 of one degree. With the propellers rotating any change in blade angle of the inboard propeller in response to its centrifugal governor will result in movement of the cam 418 in the outboard propeller. The distributor valve will then call for a corresponding change in pitch of the outboard propeller. When this pitch change is accomplished the cam will have moved to its original position and the distributor valve restored to neutral. The overall gear ratio between the two propellers is 1-1. If a linear difference in blade angle is desired the gear 472 may be removed and a similar gear substituted having a different number of teeth cut on the same blank size. The number of teeth can be chosen to suit the ratio required. The sensitivity of the inter-propeller control may be altered changing the slope of the cam 418.

Agreement between, or a desired relation between the blade angles of the two propellers can also be established by the structure shown in Figs. 2, 15 and 16, which may be incorporated as an addition to, auxiliary to, or as an alternative for the indexing provisions of the members 398 and 402. The hereinbefore described provisions permit an advance or retard of certain parts of the cyclic gearing between the coordinating gears 126 and 472. The means now to be described effect an advance or retard of the cam 418 with respect to the blade coordinating gear 472, by means of a clutching device 500 selectively coupling the gear 476 to the shaft 482. The shaft 482 provides a thrust collar 502 against which the gear 480 is seated due to the axial pressure from a collar or sleeve 504 by a spring 506. The pinion is capable of rotating on the shaft but has toothed engagement 508 with the proximate end of the collar 504, which in turn is drivingly connected with the shaft by means of a flat 510 or other provisions. The threaded end of the shaft is fitted with a washer 512 to engage the spring 506 and the other end of the collar where it may be maintained by an appropriate nut 514. The adjusting means is made accessible from without the propeller by recessing the flanged spacer ring 473 to accommodate the clutching device, and the hub face plate 466 is apertured to receive a sleeve 516 within which the collar 504 is supported and sealed by the O rings 518 and 520. A snap cap 522 covers the end of the clutching means and may be removed when it is desirable or necessary to make a change in the blade relation.

In making the change by this means the cap 522 is first removed and then the nut 514 is loosened and backed away from the collar 504. The spring 506 will then expand and keep the ribbed clutch faces in engagement. With the clutching connection loosened a screwdriver is applied to the slot 524 and the shaft 482 is turned to effect the necessary or desired adjustment. The gear relation between the pinion 480 and coordinator 476 being restrained by its connection to the master gear, the pinion 480 will not turn upon turning of the shaft 482, but the clutch or toothed relation 508 will provide clicking of the parts as the angular relation between the pinion and the shaft is changed. Turning of the shaft 482 causes rotation of the sleeves 388 and 405 as has been explained, and the direction of that rotation determines the advance or retard of the cam 418 relative to the valve plunger 438.

While the embodiments of the present invention as herein disclosed, constitute preferred forms, it is to be understood that other forms might be adopted, all coming within the scope of the claims which follow.

What is claimed is as follows:

1. Means for coordinating the pitch of coaxially arranged and contra-rotative propellers, comprising for the blades of each propeller, a master gear, an inter-connecting gear mechanism including a pair of internal gears one of which is drivingly connected with the master gear of one propeller, a pair of sun-gears one of which is drivingly connected with the master gear of the other propeller, a pair of planet gears each of which mesh with an internal gear and a sun-gear, said planet gears being carried by a common spider, whereby controlled relative rotation between the internal gears effects, through the medium of the planet gears, relative rotation between the sun-gears, means for translating the relative rotation between the sun-gears to control the blade angle of said other propeller and rotation of its master gear, and means for translating the rotation of said last mentioned master gear to reverse relative rotation of said sun-gears.

2. In a dual contra-rotative propeller, the combination comprising, a controllable pitch regulator mechanism for one propeller, a constant speed regulator mechanism for the other propeller, each propeller and its control mechanism being a self-contained, unitary assembly, and each having a master gear responding to the blade angle change of its respective propeller blades, an interconnecting gear mechanism for introducing the blade angle change of the constant speed propeller to the control mechanism of the other propeller, said interconnecting gear mechanism comprising a pair of internal gears relatively rotatable in response to movement of the master gear of the constant speed propeller, a pair of sun-gears relatively rotatable in response to relative rotation of the internal gears and in response to movement of the master gear of the controllable pitch propeller, and a pair of planet gears each meshing with an internal gear and a sun-gear, a floating spider with means for independently journalling the planet gears, whereby movement of the master gear of the controllable pitch propeller effects reverse relative rotation of the sun-gears, and means for translating the relative rotation of the sun gears to movement of a part of the controllable pitch regulator.

3. In a dual contra-rotative propeller, the combination comprising, an inboard propeller having a hydraulically actuated constant speed regulator mechanism, an outboard propeller having a hydraulically actuated controllable pitch regulator mechanism, both regulator mechanisms having constantly operable pressure developing means and a pressure distributing valve, characterizing self-contained units, a master gear in each propeller responding to blade angle change of the respective propeller, a cyclical gear train interposed between the propellers and including a pair of internal gears adapted for relative rotation upon movement of the master gear in the inboard propeller, a pair of sun-gears adapted for rotation upon movement of the master gear in the outboard propeller, a pair of planet gears meshing each with an internal gear and a sun gear, a spider supporting the planet gears and adapted to effect constant operation of the pressure developing means in the outboard propeller, means effecting constant operation of the pressure developing means in the inboard propeller, and means including one of the sun-gears for moving the pressure distributing valve of the outboard propeller in response to the relative rotation between the sun-gears, movement of the master gear in the outboard propeller effecting corrective movement of the pressure distributing valve in the outboard propeller, whereby a blade angle change in the inboard propeller is indicated in the outboard propeller, with a coordinated blade angle change in the outboard propeller.

4. In an aircraft propeller assembly, the combination comprising, a controllable pitch propeller having blades and a fluid pressure control device including a valve for adjusting the blade angle, a rotatable shaft extending from an engine nose for supporting the propeller, a pair of sun-gears rotatable with the propeller but adapted to rotate relative to the shaft and relative to each other, a master gear for coordinating the pitch change of the blades, means transmitting rotation of the master gear to one of the sun-gears, means including a cam on the other sun-gear for altering the position of said valve, a pair of internal gears with means on the engine nose for rotating one of them relative to the other, a pair of planet gears meshing each with an internal gear and a sun-gear, and adapted upon relative rotation of the internal gears to effect relative rotation of the sun-gears and consequentially a change in position of said valve to effect a change in blade angle, said master gear and its transmission to the said one sun-gear effecting restoration of said valve.

5. In an aircraft propeller assembly, the combination comprising, a controllable pitch propeller having blades and a fluid pressure control device including a valve for adjusting the blade angle, a rotatable shaft extending from an engine nose for supporting the propeller, a pair of sun-gears rotatable with the propeller but adapted to rotate relative to the shaft and relative to each other, a master gear for coordinating the pitch change of the blades, means transmitting rotation of the master gear to one of the sun gears, means including a cam on the other sun-gear for altering the position of said valve, a pair of internal gears with means on the engine nose for rotating one of them relative to the other, a pair of planet gears meshing each with an internal gear and a sun-gear, and adapted upon relative rotation of the internal gears to effect relative rotation of the sun-gears and consequentially a change in position of said valve to effect a change in blade angle, said master gear and its transmission to the said one sun-gear effecting restoration of said valve and means for adjusting the blade angle with respect to the controlling position of the valve.

6. Means for equalizing the pitch shift of a set of blades on one propeller with the pitch shift of a set of blades on a coaxial propeller, comprising a hub and set of pitch shiftable blades for each propeller, means in each propeller for effecting pitch shift movement of the respective set of blades, a master gear in each propeller coordinating the shift of all of the blades of the respective set, a pair of internal ring gears one of which is driven by one of the hubs, and the other of which is driven by the master gear of that hub and adapted to rotate relative to the said one internal gear, twin sets of planet gears each set of which is driven by one of said internal gears, a pair of concentric sleeves extending between the hubs and each of which carry a sun-gear meshing with one of said sets of planets, one of said sleeves providing a cam operable upon the pitch effecting means in said other hub, and means actuated by the master gear of said other hub for rotating the other sleeve relative to the cam carrying sleeve.

7. In a dual contra-rotative propeller having fore and aft propeller units coaxially arranged and comprising each a self contained hydraulic regulator with motor means for shifting the pitch of the blades of the respective unit, the combination of means for equalizing the shift of blades in one unit with the shift of the blades in the other unit, and comprising, a master gear in each unit coordinating the shift of the blades in the respective unit, an internal gear driven by the master gear of the aft unit, a set of planet pinions driven by the internal gear, a coaxially disposed sleeve having a sun-gear driven by said set of planet gears, a second gear on said sleeve having a driving relation with the master gear of the fore unit, an outer sleeve coaxial of and rotatable relative to the first mentioned coaxial sleeve and providing means to effect a change in blade shift of the fore unit, a sun-gear carried by said second sleeve, a second set of planet pinions engaging said last mentioned sun-gear, an internal ring gear adapted to actuate said last mentioned planet pinions, and means for driving said last mentioned internal ring gear from the hub of the aft unit, said driving means including provisions for shifting the angular relation between the aft hub unit and the last mentioned internal ring gear whereby an initial differential pitch setting between the blades of the two units may be established.

8. In a dual contra-rotative propeller having fore and aft propeller units coaxially arranged and comprising each a self contained hydraulic regulator with motor means for shifting the pitch of the blades of respective unit, the combination of means for equalizing the shift of blades in one unit with the shift of the blades in the other unit, and comprising, a master gear in each unit coordinating the shift of the blades in the respective unit, a gear train connecting the master gear of the aft unit with the master gear of the fore unit and including a ring gear and planet pinion drivable by the master gear of the aft unit, and a sun-gear engaging the planet pinion and drivable by the master gear of the fore unit, a second gear train connecting the aft hub with the pitch shifting means of the fore unit and including a ring gear and planet pinion drivable by the aft hub; and a sun gear engaging the last said planet and provided with a cam for actuating the pitch shifting means of the fore unit, and means for supporting the planets in floating relatively rotatable relation whereby relative rotation of the aft hub and its respective master gear will effect actuation of the pitch shifting means of the fore unit, and relative rotation of the fore hub and its master gear will interrupt actuation of the pitch shifting means of the fore unit.

9. In a dual contra-rotative propeller, the combination comprising, an inboard propeller having a hydraulically actuated constant speed regulator mechanism, an outboard propeller having a hydraulically actuated controllable pitch regulator mechanism, both regulator mechanisms having a pressure distributing valve for effecting a change in blade angle and characterizing a self-contained unit, a master gear in each propeller respondng to blade angle change of the respective propeller, means for establishing a differential of blade angle setting for the blades of one propeller as compared with the angle setting of the blades of the other propeller, means for actuating the distributing valve in one regulator in response to blade angle change of the other propeller, means for reversely actuating the distributing valve of said one regulator in response to blade angle change of the respective propeller, and means for equalizing the pitch angle change of one propeller with the pitch angle change of the other propeller including said means for actuating and reversely actuating said distributing valve.

10. The combination set forth in claim 9 wherein the means for establishing a differential of blade angle setting of the blades of the propellers includes a selective connection between the master gear of the said other propeller and distribution valve of the said one regulator.

11. The combination set forth in claim 9 wherein the means for establishing a differential of blade angle setting of the blades of the propellers includes an angularly shiftable connection in the said reverse valve actuating means between the master gear and distributing valve of said respective propeller.

12. The combination set forth in claim 9 in which means for establishing a pitch differential between the blades of the two propellers includes a pinion meshing with the master gear of the said respective propeller, a shaft having a gear connection with the means for reversely moving the distributing valve of the said respective propeller and journalled in said pinion, selective means joining the pinion to the shaft in a driving relation, and means for securing the driving means in a selected relation.

13. The combination set forth in claim 9 in which means for establishing a pitch differential between the blades of the two propellers includes in part an angularly selective connection in the means for actuating the distributing valve from the said other propeller, and in part an angularly shiftable connection in the means for reversely actuating said distributing valve.

14. In a dual contra-rotative propeller, the combination comprising, an inboard propeller having a hydraulically actuated constant speed regulator mechanism an outboard propeller having a hydraulically actuated controllable pitch regulator mechanism, both regulator mechanisms having a pressure distributing valve for effecting a change in blade angle and characterizing a self-contained unit, a master gear in each propeller responding to blade angle change of the respective propeller, means for establishing a differential of blade angle setting for the blades of the outboard propeller as compared with the angle setting of the blades of the inboard propeller, means for actuating the distributing valve of the outboard propeller in response to blade angle change of the blades in the inboard propeller, means for reversely actuating the distributing valve of the outboard propeller in response to blade angle change of the blades of the respective propeller, and means for equalizing the pitch angle change of the blades of the outboard propeller with the pitch angle change of the blades of the inboard propeller, including a pair of cyclic gear trains with pinions and a common spider supporting the pinions of both trains for relative rotation.

THOMAS B. MARTIN.
KENNETH L. BERNINGER.

REFERENCES CITED

The following references are of record in the file of this patent:

UNITED STATES PATENTS

| Number | Name | Date |
|---|---|---|
| 2,318,929 | Hoover | May 11, 1943 |
| 2,232,683 | Lloyd | Feb. 25, 1941 |
| 2,334,175 | Clay | Nov. 16, 1943 |
| 2,297,226 | Muller-Keuth et al. | Sept. 29, 1942 |
| 2,032,254 | Caldwell | Feb. 25, 1936 |
| 2,307,102 | Blanchard et al. | Jan. 5, 1943 |
| 2,186,199 | Martin | Jan. 9, 1940 |
| 2,184,143 | Hoover | Dec. 19, 1939 |
| 2,362,444 | Blanchard et al. | Nov. 14, 1944 |
| 1,969,280 | Smith | Aug. 7, 1934 |
| 2,338,420 | Freitag | Jan. 4, 1944 |
| 2,367,230 | McCoy | Jan. 16, 1945 |
| 2,389,161 | McCoy | Nov. 20, 1945 |
| 2,394,299 | Friedrich | Feb. 5, 1946 |

FOREIGN PATENTS

| Number | Country | Date |
|---|---|---|
| 50,160 | France | Jan. 17, 1940 |
| 483,760 | Great Britain | Apr. 26, 1938 |
| 772,115 | France | Oct. 23, 1934 |
| 550,354 | Great Britain | Jan. 5, 1943 |